US010967256B2

(12) United States Patent
Fortuna, Jr.

(10) Patent No.: US 10,967,256 B2
(45) Date of Patent: Apr. 6, 2021

(54) METHOD AND SYSTEM FOR COMPUTER-AIDED STATEFUL LIVE-ACTION GAME PLAY

(71) Applicant: Kind Troll Inc., Dover, DE (US)

(72) Inventor: Joseph A. Fortuna, Jr., Brooklyn, NY (US)

(73) Assignee: Kind Troll Inc., Dover, DE (US)

( * ) Notice: Subject to any disclaimer, the term of this patent is extended or adjusted under 35 U.S.C. 154(b) by 58 days.

(21) Appl. No.: 16/378,123

(22) Filed: Apr. 8, 2019

(65) Prior Publication Data

US 2019/0232161 A1    Aug. 1, 2019

Related U.S. Application Data

(63) Continuation-in-part of application No. 15/369,485, filed on Dec. 5, 2016, now Pat. No. 10,349,252.

(60) Provisional application No. 62/298,501, filed on Feb. 23, 2016.

(51) Int. Cl.
| | |
|---|---|
| *A63F 13/212* | (2014.01) |
| *A63F 13/219* | (2014.01) |
| *A63F 13/35* | (2014.01) |
| *G06K 7/10* | (2006.01) |
| *A63F 13/335* | (2014.01) |

(Continued)

(52) U.S. Cl.
CPC ............ *A63F 13/35* (2014.09); *A63F 13/212* (2014.09); *A63F 13/219* (2014.09); *A63F 13/335* (2014.09); *G06F 9/4498* (2018.02); *G06K 7/10386* (2013.01); *A63F 13/837* (2014.09)

(58) Field of Classification Search
None
See application file for complete search history.

(56) References Cited

U.S. PATENT DOCUMENTS

| | | |
|---|---|---|
| 10,349,252 B2 | 7/2019 | Fortuna, Jr. |
| 2011/0300944 A1 | 12/2011 | Raynal |
| 2013/0184085 A1 | 7/2013 | Clark |

(Continued)

OTHER PUBLICATIONS

Notice of Allowance; U.S. Appl. No. 15/369,485, title "Method and System for Computer-Aided Stateful Live-Action Game Play", dated May 13, 2019.

(Continued)

*Primary Examiner* — Damon J Pierce
(74) *Attorney, Agent, or Firm* — Hamilton, Brook, Smith & Reynolds, P.C.

(57) ABSTRACT

A computing system that includes wearable computing components may be provided that creates an interactive game for at least two players. Finite state machines may be provided with a range of states that correspond to an array of possible states of a player of the game. Each player is assigned a client device, which preferably may be embedded in wearable computing components. The client device uses software to execute a first instance of a finite state machine. The client deceives are connected in a network with server devices. The state machines transition states based upon player interaction with other players and objects. When the state machines transition states, the players are notified and their respective states within the game also change. A programmable game server can be used to process rules of interactive game and to enable a user to specify rules for other or new interactive games.

19 Claims, 13 Drawing Sheets

(51) Int. Cl.
*G06F 9/448* (2018.01)
*A63F 13/837* (2014.01)

(56) References Cited

U.S. PATENT DOCUMENTS

| | | |
|---|---|---|
| 2014/0287806 A1 | 9/2014 | Balachandreswaran |
| 2015/0057057 A1* | 2/2015 | Fischer ................ A63F 13/837 463/7 |
| 2015/0126260 A1* | 5/2015 | Lynch ................ A63H 33/009 463/8 |
| 2017/0245098 A1 | 8/2017 | Fortuna, Jr. |

OTHER PUBLICATIONS

Non-Fiinal Office Action; U.S. Appl. No. 15/369,485, title "Method and System for Computer-Aided Stateful Live-Action Game Play", dated Jan. 29, 2019.

https://www.youtube.com/watch?v=agxsEUlbWc8 Document retrieved from the Internet on May 23, 2017.

https://www.youtube.com/watch?v=G_7i-xGztQc Document retrieved from the Internet on May 23, 2017.

\* cited by examiner

SINGLE-UNIT
WEARABLE DESIGN
202-2

FRONT VIEW
203

POWERUP TAG "GLOVE" UNIT

METHOD AND SYSTEM FOR COMPUTER-AIDED STATEFUL LIVE-ACTION GAME PLAY

RELATED APPLICATIONS

This application is a continuation-in-part of U.S. application Ser. No. 15/369,485, filed Dec. 5, 2016, which claims the benefit of U.S. Provisional Application No. 62/298,501, filed on Feb. 23, 2016. The entire teachings of the above applications are incorporated herein by reference.

BACKGROUND

A conflict currently exists for parents of children between the ages of 5 and 12. The principal conflict in question involves the gravitational tug of video games and the desire of parents for their children to experience the portion of the universe that exists outside their house, and to ever use muscles other than the ones needed to operate a video game controller.

Parents want their children to exercise and to play outside, and children want to play video games. In reality, children also want to play outside. Most debates of this nature begin with operatic battles of will (the child resisting the idea of outside play, the parent desperately trying to tear the child away from their console, or tablet, or phone), and they end with a similar operatic battle (the child begging to be allowed to remain on the playground with their friends, and the parent desperately trying to get the child home for a meal and rest).

What that suggests is that the escapism available on the screen is similarly available in the flesh.

One only has to perform a brief survey of the games that children play to understand this essential truth: freeze tag, museum, flashlight tag, four square, etc.

Each of these playground games involves the same components of power and credits available in video games. The trouble with video games is that those components are readily available at the flick of a switch, whereas playground games involve social negotiations and machinations unavailable to those of younger years.

SUMMARY

Video games are often perceived to have a negative impact on child development, in part due to the lack of physical exercise and social experiences. In many cases, children end up having more screen time than spending time playing sports that involve physical exercise. This lack of physical exercise could be a factor in the emerging childhood obesity epidemic in society today. Parents and educators everywhere are concerned about this phenomenon and they are urging children to not spend so much time playing video games.

Many new systems, such as the Nintendo WII, have come out with games that actually require users to actually get up and move. While the physical benefits for users of such systems are clear, it is known that benefits of such systems have their limitations. Such simulated sports systems are not as comprehensive relative to the benefits that result from doing the actual sport. In simulated sports games, physical strength and endurance are not limiting factors. Also, the use of the controller (joystick) is sometimes required, which are known to cause ailments, such as "Nintendo elbow" and "Ulcerative Nintendinitis".

The present system provides an interactive game that is appealing to both parents and children alike. The present system can provide a physically, intellectually, and socially challenging game for users, in which the game may take place in a natural setting or other desirable venue, such as a playground setting.

Embodiments take the form of a computing system for providing an interactive game and may include at least one of an apparatus, method and computer product program. The example embodiment includes a radio-frequency identification (RFID) tag configured to produce a radio-frequency (RF) signal. In some embodiments, the RFID tag is attached to a user's hand with glove-like accessory. The example embodiment includes at least two satellite devices paired with at least two users. The satellite devices, depending on the embodiment, may take the form of a computer, mobile device, virtual reality device, or a dedicated apparatus such as the powertag wearable unit. The satellite devices contain RFID tag readers that are able to receive and decode radio-frequency (RF) signals produced by RFID tags. Each satellite device possesses a range of states that corresponds to a range of states the satellite device's user might be placed in during the playing of a game (e.g., pursuer, pursuee, safe, frozen etc.). When, during the playing of a game, a satellite device changes state, the user of the satellite device changes state as well. This creates a flexible, high paced, and unpredictable game for the users to play.

The satellite devices can change states in response to a multitude of situations and stimulations, providing different ways for users to interact with both each other and the environment. The satellite devices, in response to receiving and decoding a radio-frequency (RF) signal, produced by the RFID tag, change state. The satellite devices, in some embodiments, monitor themselves for state changes. If a satellite device does not undergo a state change after a set programmable period of time, in some embodiments, the satellite device changes state.

Some embodiments include at least one centralized device that also contains a RFID tag reader configured to receive and decode a radio-frequency (RF) signal produced by a RFID tag. The centralized device, depending on the embodiment, may take the form of a computer, server, mobile device, or dedicated apparatus such as the powertag base unit. The centralized device in response to receiving and decoding a radio-frequency (RF) signal produced by a RFID tag sends a transition radio-frequency signal to at least one satellite device. The transition radio-frequency signal(s), when received by the satellite device(s), cause the satellite device(s) to change state. The centralized device also monitors the satellite devices for state changes. If a state change is detected, the centralized device broadcasts a notification radio-frequency (RF) signal to all the satellite devices. In some embodiments, the notification radio-frequency (RF) signal contains the identity of the satellite device that changed state and the identity of the state that the satellite device transitioned to.

In some embodiments, the satellite devices include input/output devices (speakers, lights, screens, etc.). In such an embodiment, the satellite devices are configured to notify their users in response to the notification radio-frequency (RF) signal. The user notification can take the form of a sound, flashing lights, text message, vibration, or the like.

In some embodiments, the satellite devices monitor their location and trajectory relative to other satellite devices. The satellite devices may also be configured to change state if their relative trajectory and location meet set programmable conditions. In other embodiments, the monitoring of the location and trajectory of the satellite devices occurs at the centralized device which only sends transition signals to satellite devices if the location and trajectory of the satellite device satisfies set programmable conditions. Location and trajectory monitoring can be accomplished through GPS tacking, Bluetooth technology, infra-red sensors, or other similar technology.

The centralized device, in some embodiments, is configured to monitor the current state of all the satellite devices and only send a transition radio-frequency (RF) signals to satellite devices in designated states. Designated states are determined by the rules of the game and/or the type of centralized device.

The radio-frequency (RF) signal, produced by the RFID tag in some embodiments, contains a user identification number. Each satellite device may be assigned an identification number. The centralized device may only send a transition radio-frequency signal to the satellite device whose identifications number matches the user identification number contained in the received and decoded radio-frequency signal. In one embodiment, a RFID tag is attached to a user's hand with a wearable glove.

In some embodiments, the transition radio-frequency signals sent to the satellite devices from a centralized device contain the identity of the sate satellite devices will transition to. In other embodiments, the transition radio-frequency signal does not contain the identity of the state the satellite device will transition to and the satellite devices must analyze the transition signal and other factors to determine the identity of the state they will transition to.

Another example embodiment is a computing system for providing an interactive game. The example computing system includes a game server, a radio-frequency identification (RFID) tag, a first satellite device having a first RFID tag reader, and a second satellite device having a first RFID tag reader. The RFID tag is configured to produce a radio-frequency (RF) signal. The first satellite device is configured to receive, decode, and transmit to the game server the RF signal produced by the RFID tag with the first RFID tag reader. The second satellite device is configured to receive, decode, and transmit to the game server the RF signal produced by the RFID tag with the second RFID tag reader. The game server is configured to, responsive to receiving RF signals, determine states of the first satellite device and the second satellite device based on instructions for the interactive game, and broadcast a first and a second transition RF signal based on the determined states. The first satellite device is configured to change state in response to the first transition RF signal, and the second satellite device is configured to change state in response to the second RF transition signal.

The game server can be, for example, a mobile telephone, tablet, or laptop computer. In some embodiments, the game server can be configured to be programmed with instructions for multiple interactive games. In such embodiments, the game server can include an interface configured to accept instructions for an interactive game, or an interface configured to enable a user to specify instructions for an interactive game.

In some embodiments, the system includes a centralized device, having a third RFID tag reader, configured to receive and decode the radio-frequency (RF) signal produced by the RFID tag with the third RFID tag reader, and, responsive to receiving and decoding the RF signal of the RFID tag, broadcast the first and second transition RF signals. The centralized device can be in communication with the game server and can determine the first and second transition radio-frequency (RF) signals based on the instructions for the interactive game. The centralized device can further be configured to monitor the first satellite device and the second satellite device for state changes, and if a state change is detected transmit a notification to the game server. In some embodiments, the game server can reside on the centralized device.

BRIEF DESCRIPTION OF THE DRAWINGS

The foregoing will be apparent from the following more particular description of example embodiments of the example embodiment, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows. In the following description, the terms client computer, client device, client processor, and satellite device are used interchangeably. In the following description, the terms centralized device, server, and server computer are used interchangeably.

Digital Processing Environment

Figure 1A:
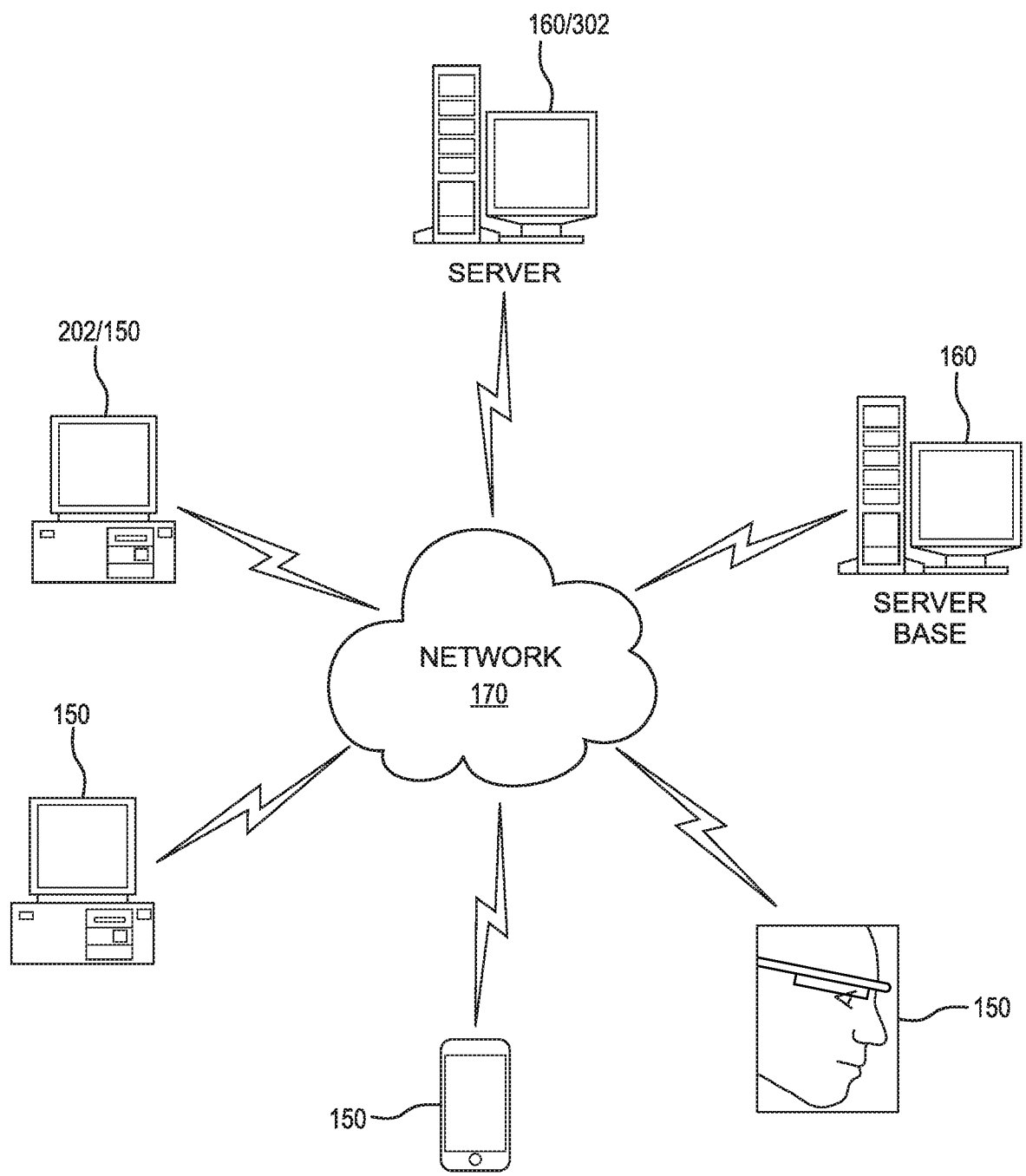
FIG. 1A is a schematic diagram of an example computer network environment in which embodiments can be deployed.

Example implementations of a computing system for providing an interactive game may be implemented in a software, firmware, or hardware environment. FIG. 1A illustrates one such non-limiting environment. Referring now to FIG. 1A, client computer(s) 150, 202, (e.g. power tag main unit, computer, mobile phone, virtual reality device, etc.) server computer(s) 160, 302 (e.g. power tag base unit, computer, mobile phone, etc.) and a central computing cloud 170 (or server computer or cluster thereof) provide processing, storage, and input/output devices executing application programs and the like.

Client computer(s)/devices 150, 202, are linked through communications network 170 to other computing devices, including other client devices/processors 150, 202 and server computer(s) 160, 302. The cloud 170 can be part of a remote access network, a global network (e.g., the internet), a worldwide collection of computers, Local Area or Wide Area Networks, or gateways that currently use respective protocols (TCP/IP, Bluetooth, etc.) to communicate with each other. Other electronic device/computer network architectures are suitable.

The server computer(s) 160, 302 are configured to detect, monitor, and/or marshal changes in the states of state machines executed on the client computer(s)/devices 150, 202 and to communicate the changes in the states of state machines executed on the client computer(s)/devices 150, 202 to other client computer(s)/devices 150, 202 connected to network 170.

Figure 1B:
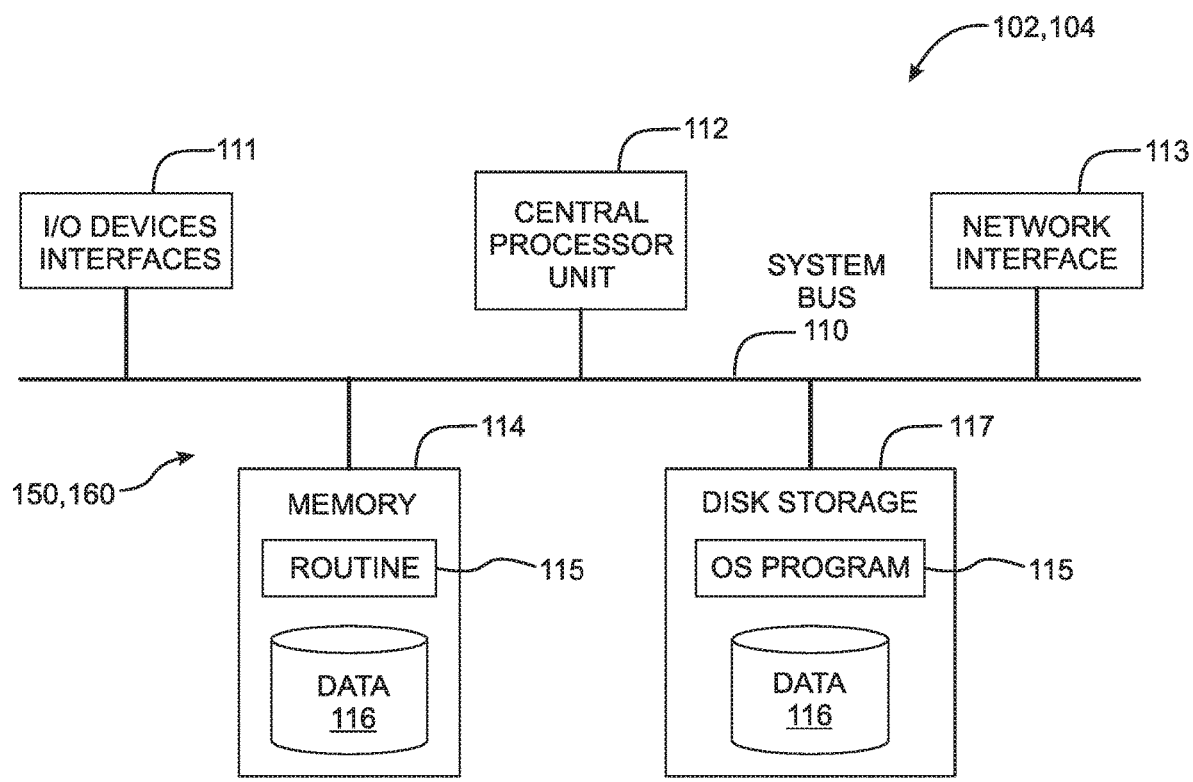
FIG. 1B is a block diagram of certain components of the computer nodes in the network of FIG. 1A.

FIG. 1B is a block diagram of the internal structure of a computer/computing node (e.g., client processor/device/mobile phone device/tablet/virtual reality device/augmented reality device 150 or server computer 160) in the processing environment of FIG. 1A, which may be used to facilitate displaying audio, image, video, state information or data signal information. Embodiments of the invention may include means for displaying audio, image, video, state information or data signal information. The computer/device 150, 160 in FIG. 1B contains a system bus 110, where a bus is a set of actual or virtual hardware lines used for data transfer among components of a computer or processing system. Bus 110 is essentially a shared conduit that connects different elements of a computer system (e.g., processor, disk storage, memory, input/output ports, etc.) that enables the transfer of data between the elements.

Attached to system bus 110 is I/O device interface 111 for connecting various input and output devices (e.g., keyboard, mouse, touch screen interface, displays, printers, speakers, audio inputs and outputs, video inputs and outputs, microphone jacks, etc.) to computer/device 150, 160. Network interface 113 allows the computer to connect to various other devices attached to a network (for example the network illustrated at 170 of FIG. 1A). Memory 114 provides volatile storage for computer software instructions 115 and data 116 used to implement software implementations of components of the present invention.

Software components 114, 115 of the computing system for providing an interactive game described herein may be configured using any known programming language, including any high-level, object-oriented programming language. The computing system for providing an interactive game may include instances of a state machine executed by software instructions 115 and memory 114 on client computer(s)/device 150, 202 that communicates to the server computer(s) 160, 302 through the communication network 170. The computing system for providing an interactive game may include instances of stations (of which there may be multiple types) executed by software instructions 115 and memory 114 on server 160, 302 that communicates to the client computer(s)/devices 150, 202 through the communication network 170.

In a mobile implementation, a mobile agent implementation of the invention may be provided. A client server environment can be used to enable a mobile computing system for providing an interactive game using server 160. It can use, for example, the XMPP protocol to tether a mobile device 150 to a server 160, 302. The server 160, 302 can then issue commands to the phone on request. The mobile user interface framework to access certain components of the system may be based on XHP, Javelin and WURFL. In another example mobile implementation for OS X and iOS operation systems and their respective APIs, Cocoa and Cocoa Touch may be used to implement the client side components 115 using Objective-C or any other high-level programming language that adds Smalltalk-style messaging to the C programming language.

Disk storage 117 provides non-volatile storage for computer software instructions 115 (equivalently "OS program") and data 116 used to implement embodiments of the system. Central processor unit 112 is also attached to system bus 110 and provides for the execution of computer instructions.

Executing instance of respective software components of the system, such as instances of state machines and multiple types of stations may be implemented as computer program products 115, and can be installed by any suitable software installation procedure, as is well known in the art. In one embodiment, at least a portion of the system software instructions 115 may also be downloaded over a cable, communication and/or wireless connection via, for example, a browser SSL session or through an app (whether executed from a mobile or other computing device). In another embodiment, the system software components 115, may be implemented as a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instruction for the computing system for providing an interactive game.

Powerup Tag Wearable Unit

Figure 2A:
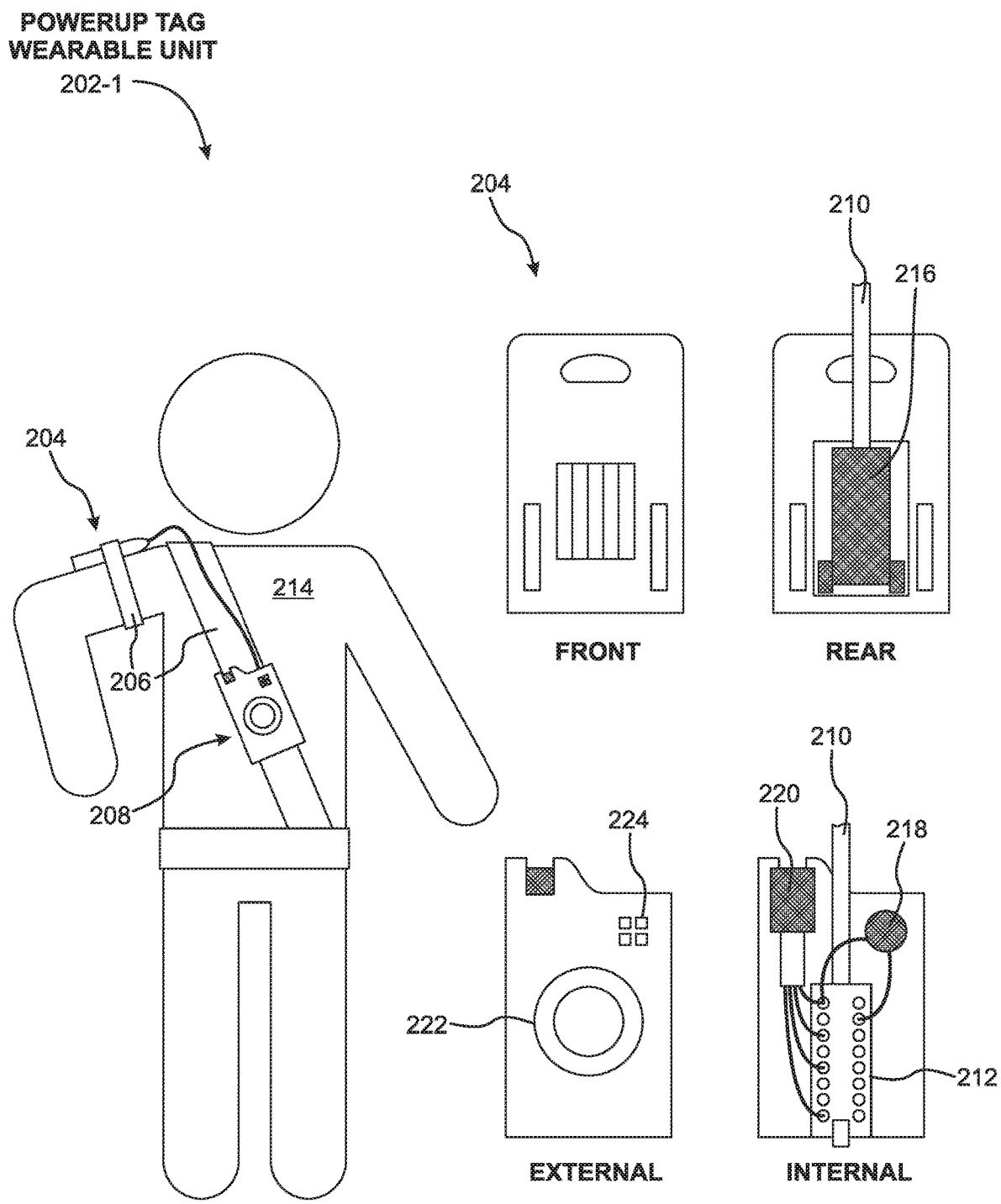
FIG. 2A is a schematic diagram of powerup tag wearable unit composed of two parts according to an embodiment of the present invention.

FIG. 2A is a schematic of an embodiment of a client device 150, 202 in the form of a powerup tag wearable unit 202-1 composed of two separate parts. The powerup tag wearable 202-1, in one embodiment unit, is composed of a shoulder unit 204 and a main unit 208. The shoulder unit 204 is connect to the main unit 208 with a connecter 210 which may be a set of actual or virtual hardware lines used for data transfer among components of a computer or processing system. In other embodiments, the connector 210 may be a form of wireless communication technology used for data transfer such as Bluetooth. Both the shoulder unit 204 and the main unit 208 can be attached to user 214 with adjustable straps 206 that fit around the user's 214 chest, waist and arm. The adjustable straps 206, allow for user 214 to carry powerup tag wearable unit 202-1 during strenuous activities (e.g., running, jumping, climbing, etc.).

The shoulder unit 204 contains radio-frequency identification (RFID) reader 216 capable of detecting and decoding radio-frequency signals produced by RFID tags. The RFID reader 216 and RFID tags may be part of either a passive reader active tag system, an active reader passive tag system, or an active reader active tag system. The shoulder unit 204 contains an access point to the connector 210 which RFID reader 216 uses to transmit the decoded information from RFID tags to the main unit 208.

The main unit 208 contains another access point to unit connector 210, microcontroller 212, piezo buzzer 218, L.E.D. array 222, and network access device 220. Microcontroller 212 consists of a processor core, memory, and programmable input/output peripherals. The microcontroller 212 receives the information decoded and detected by RFID reader 216 through unit connector 210. Network access device 220 is also capable of receiving instructions/data from a server 160 through network 170 and transmitting them to the microcontroller 212. Microcontroller 212 can access network access device 220 to send signals to other client computer(s)/devices 150, 202 and servers 160 through network 170. Microcontroller 212 can use piezo buzzer 218 and L.E.D. array 222 to produce sound and noise. Main unit 208 also contains sound ventilation 224 to allow for the noise created by piezo buzzer 218 to be easier to hear for user 214.

Figure 2B:
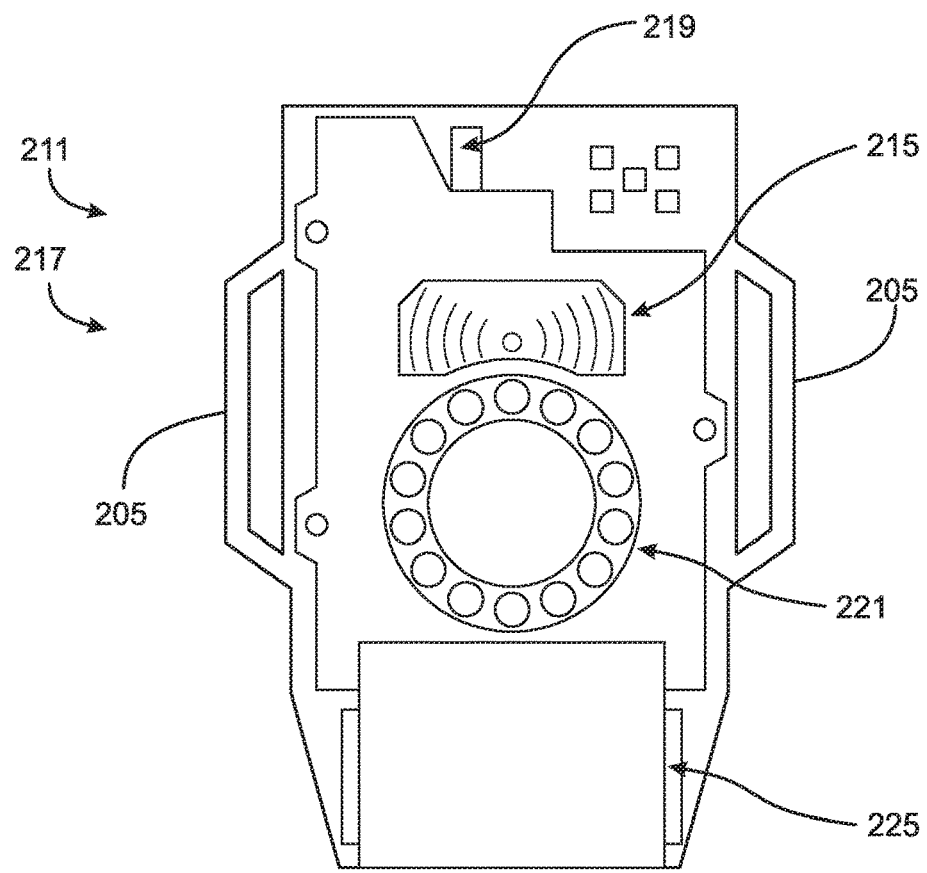
FIG. 2B is a schematic diagram of powerup tag wearable unit composed of a single part according to an embodiment of the present invention.

FIG. 2B is a schematic of an embodiment of a client device 150, 202 in the form of a powerup tag wearable unit 202-2 composed of a single unit. The powerup tag wearable unit 202-2, in one embodiment, is composed only of main unit 203 that can be attached to a user with adjustable straps are connected to main unit 203 by strap holders 205. In this embodiment, main unit 203 contains a RFID reader 215 capable of detecting and decoding radio-frequency signals produced by RFID tags, eliminating the need for a shoulder unit 204 and unit connector 210. The main unit 203 also contains microcontroller 211, piezo buzzer 217, L.E.D. array 221, and network access device/radio communicator 219. The powerup tag wearable unit 202-2, when composed of a single part, contains equivalent components of two powerup tag wearable unit 202-1 components, composed of two parts, (except unit connector 210) and the components act and interact in the same manner as described above.

Powerup Tag Base Unit

Figure 3:
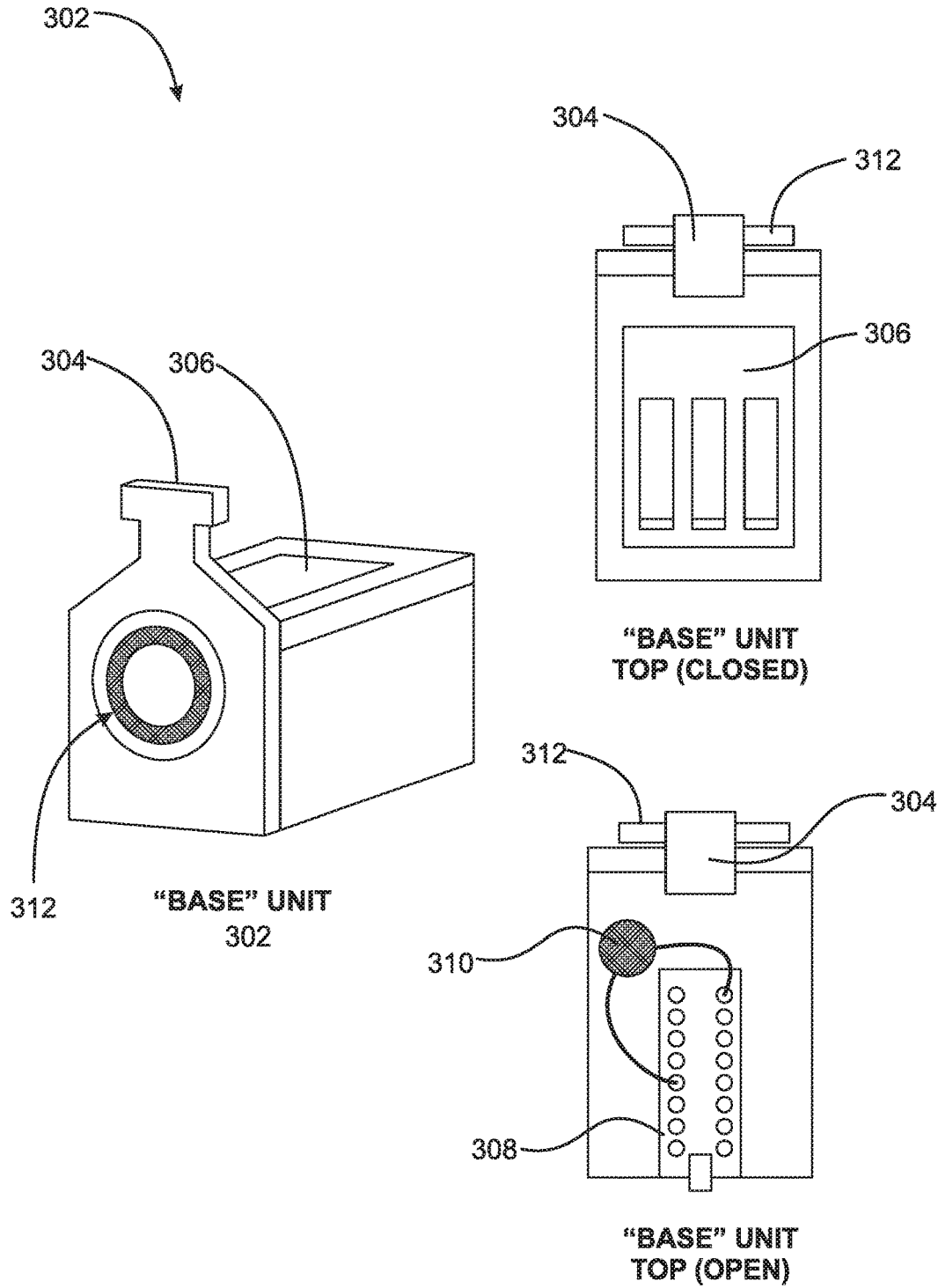
FIG. 3 is a schematic diagram of powerup tag base unit according to an embodiment of the present invention.

FIG. 3 shows an embodiment of a server computer 160 in the form of a powerup tag base unit 302. Powerup tag base unit 302 contains network mount 304, RFID mount 306, microcontroller 308, piezo buzzer 310, and LED array 312. Microcontroller 308 consists of a processor core, memory, and programmable input/output peripherals. Microcontroller 308 uses network mount 304 to send and receive signals to/from client devices 150 and other server computers 160 through network 170. Microcontroller 308 is used to run programs and can carry out other known computer functions. Base unit 302 also contains a RFID mount 306 able to access an RFID reader (not shown) and transmit the information detected and decoded by the RFID reader from radio-frequency signals produced by RFID tags to microcontroller 308. Microcontroller 308 is connected to and able to control piezo buzzer 310 and LED array 312.

State Machines

Preferably, there is an equal number of finite state machines as users 214. The state machines are paired one to one with users 214 and have states corresponding to the states that a user may be placed in during the game. In one embodiment, the state machines are executed on software components 114, 115 of microcontrollers 212 located in main units 208 of powertag wearable units 202. In other embodiments, the state machines are executed by software components 114, 115 of other types of client computer(s)/devices 150. The state machines transition between states based on electronic stimulus.

Figure 4:
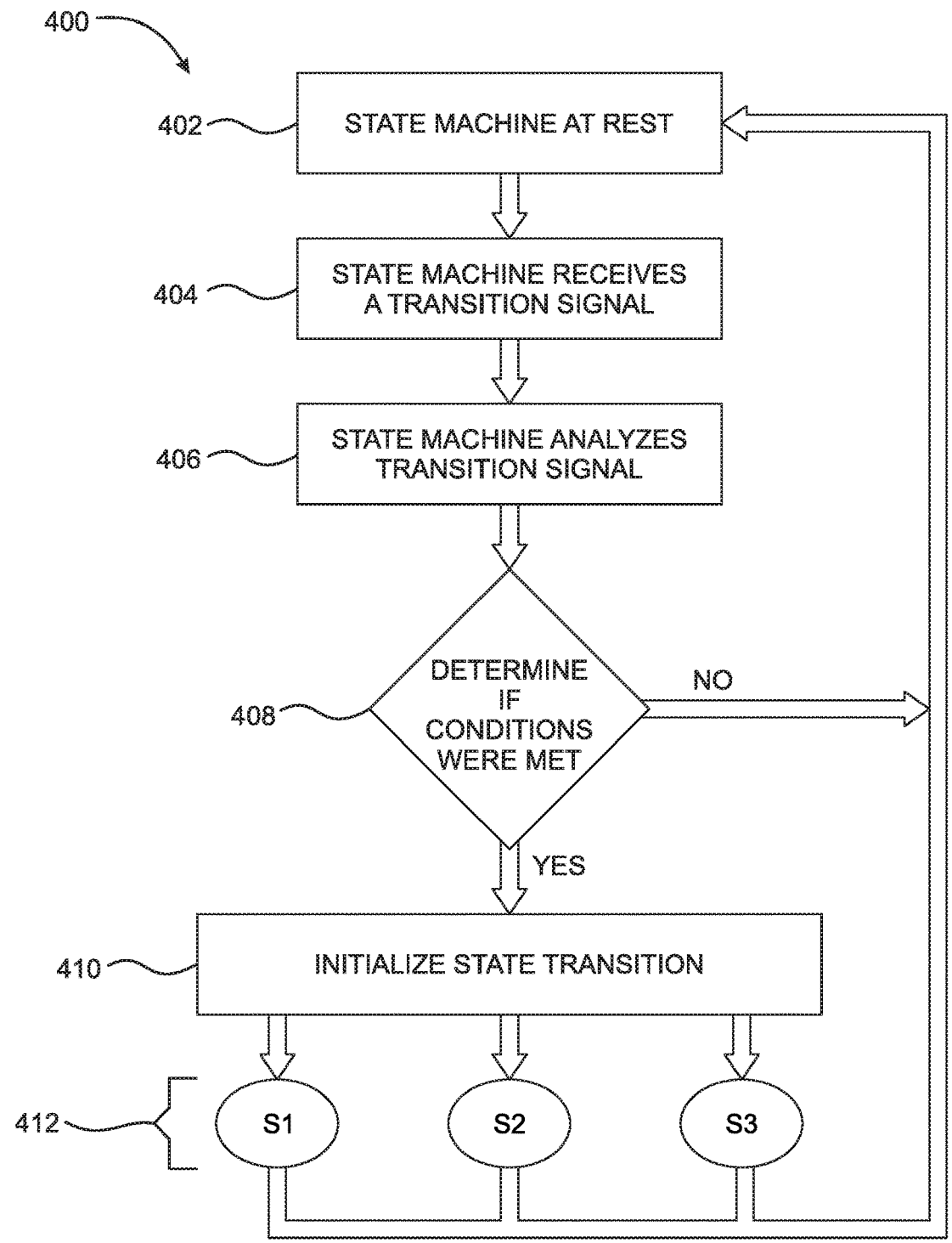
FIG. 4 is a flow diagram of an example state change process according to an embodiment of the present invention.

FIG. 4 is a flow chart of the process 400 in which a state machine transitions between states. At step 402 the state machine is in current state and at rest. At step 404 the state machine receives a signal. The signal can originate from another client device 150, 202 a server 160, 302 or the state machines host client device 150, 202. At step 406 the state machine analyses the signal and decodes the information contained within the signal. At step 408 the state machine determines if the information contained within the signal meets the programmable conditions required to initiate a transition. If yes, the state machine moves to step 410 and initializes a state transition. If the conditions are not met, the state machine returns to step 402. Finally, at step 410, based upon the information contained in the signal and programmable game rules, the state machine transitions to one of multiple possible states. After the transition is complete the state machine returns to step 402 and is able to receive a new signal and transition states again.

In other embodiments, the analyzing of the signal, step 406, is not carried out by the state machine but instead by another computer/device 150, 160 in network 170. The other computer/device 150, 160, 202, 302 analyses the signal and determines if the information contained within the signal meets the conditions required to initiate a transition. If the conditions are met, the other computer/device 150, 160 sends a transition signal through network 170 to the state machine executed on software components 114, 115 of a client computer/device 150, 202 instructing the state machine to transition and providing the identity of the state to transition into. This embodiment, allows for a simpler state machine and client computer/devices 150, 202 that only need to respond to direct instruction and do not need to analyze information and formulate their own instructions as in step 406 and step 408.

Effects of a State Machine Transition

Users 214 participating in the interactive game are given different instructions and goals depending on what state the user is placed in and a user's 214 state is paired with the state of a state machine, executed on software components 114, 115 of the user's 214 client computer/device 150, 202. Therefore, it is essential to be able to notify users 214 of both the current state of their paired state machine, executed on software components 114, 115 of user's 214 client computer/device 150, 202, and when their paired state machine transitions to a new state. Users 214 also interact with each other and are instructed to interact differently depending on the state of other users 214 and the state of the other users' 214 paired state machines, executed on software components 114, 115 of client computers/devices 150, 202. Therefore, it is also important to notify users 214 of both the current state of other user's 214 paired state machines, executed on software components 114, 115 of client computer/device 150, 202, and when other user's 214 paired state machine transitions to a new state.

Figure 5:
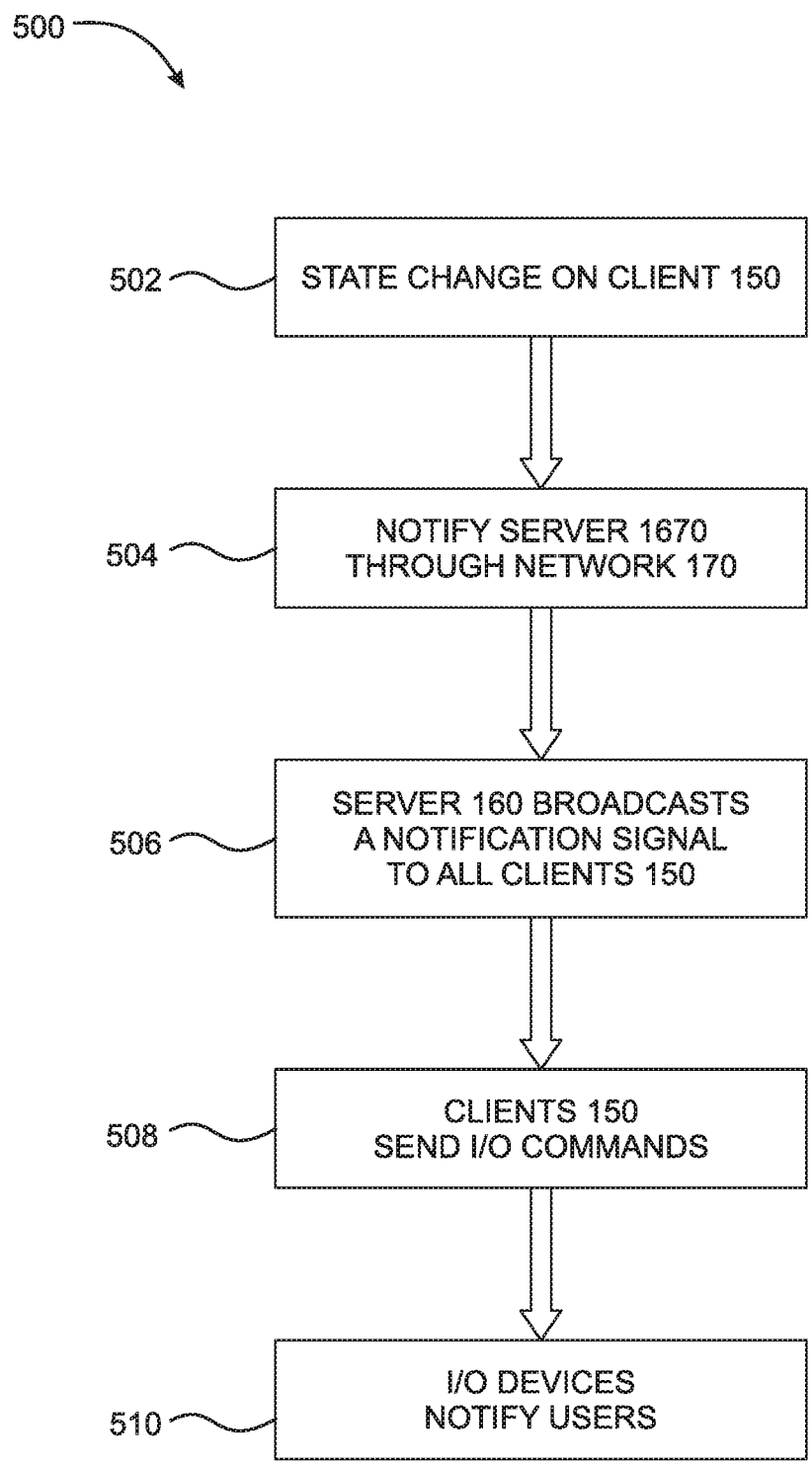
FIG. 5 a flow diagram of an example reaction to a state change according to an embodiment of the present invention.

FIG. 5 is a flow chart of process 500 which notifies all users 214 of a change in state of a state machine of any client device 150, 202. FIG. 5 includes references to the block diagram of certain components of the computer nodes FIG. 1B and references to the schematic diagram of an example computer network FIG. 1A. At step 502 a state machine, executed on software components 114, 115 of a client computer/device 150, 202, changes state. At step 504, the client computer/device 150, 202 whose state machine changed state notifies server(s) 160, 302 using network interface 113 to access network 170. At step 506, server(s) 160 rebroadcasts the notification of the change in state of client's 150 state machine to all clients 150 through network 170. At step 508, all clients 150, in response to server's 160 rebroadcast notification, send I/O commands to I/O device interface 111. Finally at step 510, each I/O device interface 111 of client computer/device 150, 202 instructs I/O device(s) to create a notification their user 214.

The following is an example of process 500 executed on two powerup wearable units 202 as embodiments of client computer 150 and a powerup base unit 302 as an embodiment of a server 160. A state machine, executed on software components 114, 115 of microcontroller 212 inside the first powerup tag wearable unit 202, changes state. The first powerup tag wearable unit 202 uses network access device 220 to send a notification of transition signal through network 170 to powerup tag base unit 302. Powerup tag base unit 302 uses network mount 304 to both receive the notification of transition signal from the first powerup tag wearable unit 202 and to rebroadcast the notification of transition signal to all client devices 150, 202 (e.g., the first powertag wearable unit and the second powertag wearable unit) connected to network 170. Both the first and second powertag wearable units receive the rebroadcasted notification of transition with network access device 220. Microcontrollers 212 in response to receiving the rebroadcasted notification of transition use piezo buzzer 218 and LED array 222 to notify users 214 of the change in state of the state machine, executed on software components 114, 115 of microcontroller 212 inside the first powerup tag wearable unit 202.

Initiating State Changes

There are several circumstances that may cause either client computer(s)/devices 150, 202 or servers 160, 302 to generate a signal that instructs a state machine, executed on software components 114, 115 of a client computer/device 150, 202, to transition. Embodiments of may have the state machines to transition based on any combination of the following circumstances as well as circumstances not included. The nature of the example embodiment lends itself to a plethora of embodiments as the programmable and flexible nature of the state machines, executed on software components 114, 115 of client computer(s)/device(s) 150, 202, allows for the creation of an almost limitless amount of circumstances and interactions that could cause a state machine to transition.

A transition signal that instructs a state machine, executed on software components 114, 115 of a client computer/device 150, to transition may be generated after a set programmable period of time has elapsed. Client computer(s)/device(s) 150, 202, that the state machine is operating on, in some embodiments, monitor how long the state machine executed on software components 114, 115 has remained in a single state. If the state machine has not transitioned after a programmable period of time, the client computer/device 150, 202 that it is operating on, using software components 114, 115, will generate a transition signal instructing the state machine to transition to a new state. In other embodiments, a server 160 monitors, through network 170, how long the state machines, executed on the software components 114, 115 of each client computer(s)/device have been in a single state. If a state machine has not transitioned after a set period of time the server 160 will generate a signal instructing the state machine to transition state and deliver the signal to the client computer/device 150, 202 the state machine is operating on through network 170.

Client computer(s)/devices 150, 202 may also monitor their location and trajectory relative to each other. The monitoring of client computer(s)/devices 150, 202 may be accomplished through the use of GPS, infrared LEDs, or other technology known in the art. In some embodiments, if two client computers/devices' 150, 202 location and trajectory relative to each other fulfills set programmable conditions than one or both of the client computer(s)/devices 150, 202 may generate signals instructing their respective state machines to transition states. In an alternate embodiment, the monitoring of client computer(s)/devices 150, 202 trajectory and location, is carried out by a sever 160 in communication with client computer(s)/devices 150, 202 through network 170. The server will generate a transition signal instructing at least one state machine to transition if two client computers/devices' 150, 202 location and trajectory relative to each other fulfills set programmable conditions. The server 160 will deliver the transition signal to the client computer(s)/devices through network 170.

Figure 6:
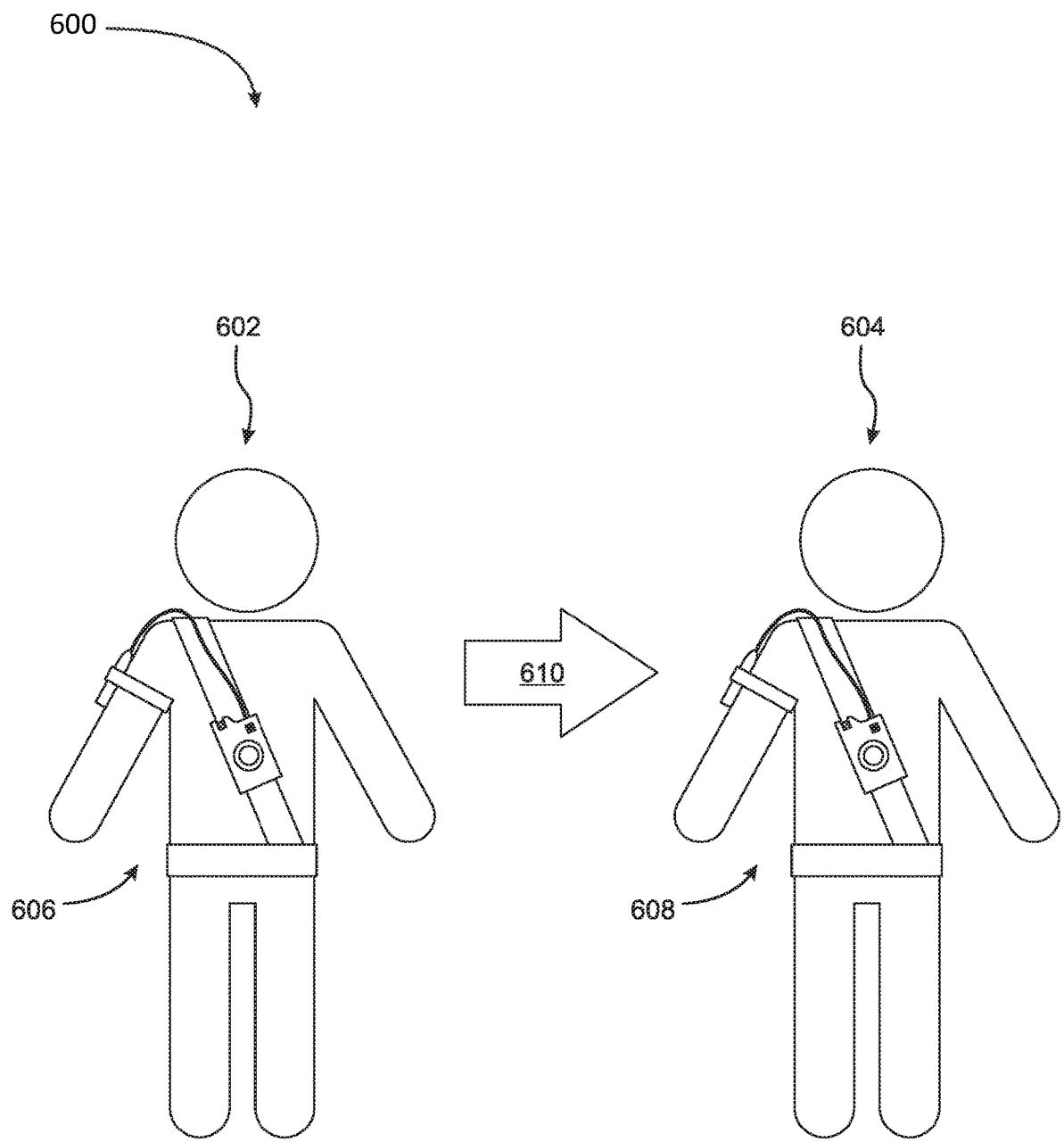
FIG. 6 is an example of an interaction that triggers a state change.

FIG. 6 provides a non-limiting example of two satellite devices 606, 608 with users 602, 604 undergoing a state change based upon their location and trajectory relative to each other. Two users 602, 604 are both wearing powerup tag wearable units 606, 608 that are acting as satellite/client devices. The location and trajectory of both powerup tag wearable units 606, 608 are monitored by powerup tag wearable units 606, 608. User one 602, with powerup tag wearable unit one 606, starts to chase 610 user two 604, with powerup tag wearable unit two 608. When the trajectory and location of powerup tag wearable unit one 606, attached to user one 602, relative to the user powerup tag wearable unit two 608, attached to user two 604 meets set programmable conditions, both powerup tag wearable unit one 606 and powerup tag wearable unit two 608 generate signals instructing their respective state machines, executed on the software components 114, 115 of their microcontrollers 212, to change state.

Radio-frequency signals generated by RFID tags when detected and decoded by a RFID reader 216, may cause client computer(s)/devices 150, 202 to generate a signal instructing the state machines executed by their respective software components 114, 115 to transition states. Severs 160, 302 may also generate signals instructing state machines executed on at least one satellite devices 150, 202 to transition when a RFID reader connected to RFID module 306 detects and decodes radio-frequencies (RF) generated by RFID tags. Servers 160, 302 deliver the transition signal to the state machines by using network 170 to communicate with client computer(s)/devices 150, 202 that execute the state machines with software components 114, 115. The state that the client computer(s)/device's 150, 202 generated signal and server's 160, 302 generated signal instruct the state machine to transition to depends on the information electronically stored on the RFID tag and embedded in the radio-frequency signal produced/generated by the RFID tag and the identity of the RFID reader 216, 306 that detected the signal.

For non-limiting example, a RFID tag may contain a user identification number and the RFID reader that detected and decoded radio-frequency signal, containing the user identification number and generated by the RFID tag, is located on server 160. Server 160 will use both the user identification number stored on the RFID tag and information about RFID reader that detected the information from the RFID tag, which includes the location of the RFID reader and the type of device (either a server 160 or a client computer/device 150) that the RFID reader is connected to, to determine which state machine should transition and what state the state machine should transition to. The server 160, 302 then uses network 170 to communicate with the client computer(s)/device 150, 202 that executes the state machine(s) chosen for transition. Client computer(s)/device 150, 202 receives the transition signal through network 170 and instructs the state machine executed on software components 114, 115 to change state.

Example Embodiments

Figure 7:
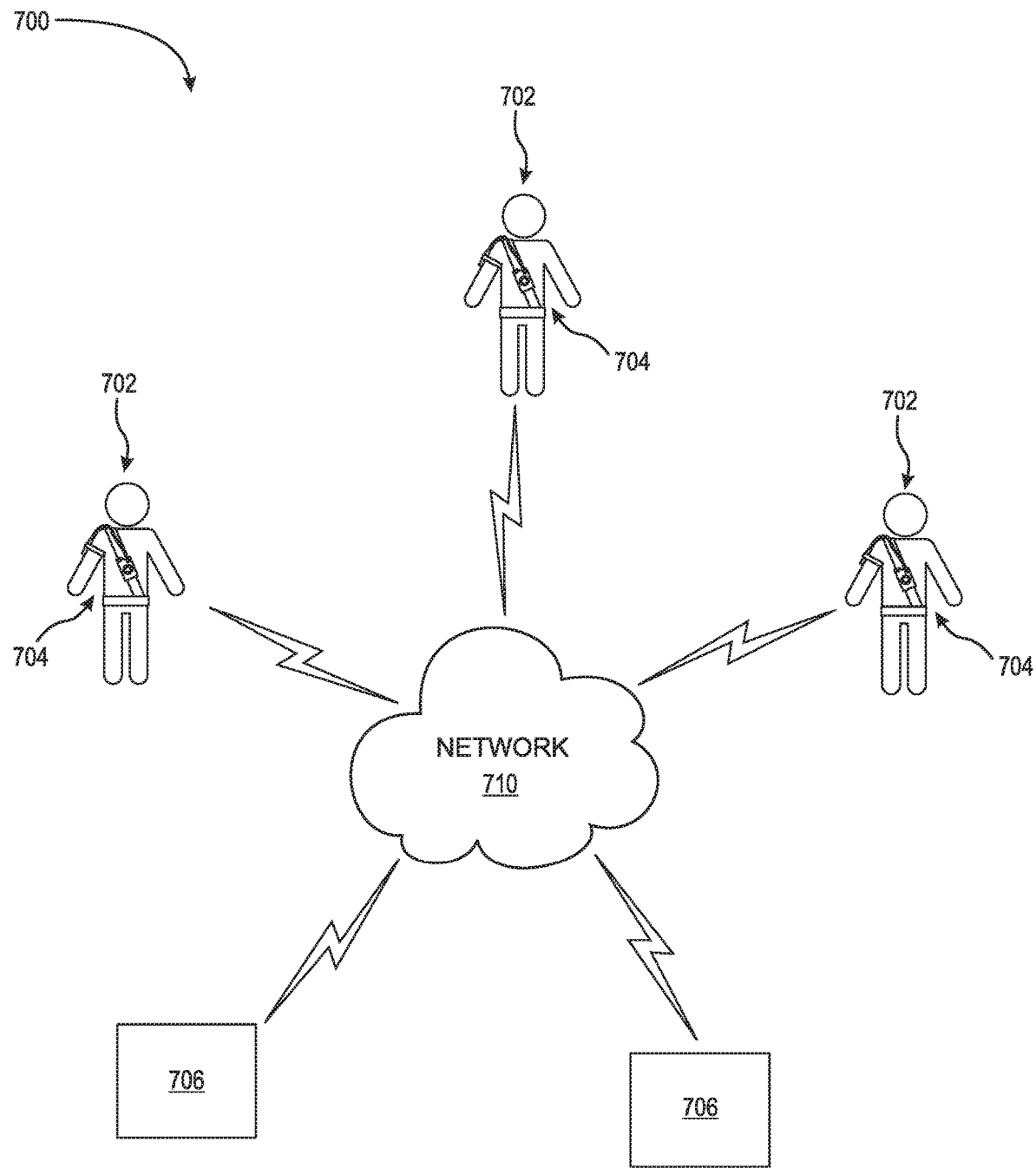
FIG. 7 is a schematic diagram of a computer network environment in which the preferred embodiment can be deployed.

FIG. 7 is a schematic diagram of the preferred embodiment's computer network 700. The example embodiment includes at least two users 702 each wearing powerup tag wearable units 202 (which can be composed of either two pieces 202-1 or one piece 202-2), 704 and at least one powerup tag base unit 302, 706. The powerup tag wearable units 704 are clients/satellite units and the power up tag base units 706 are servers/centralized units in the network 170, 710. The network 710 uses radio communication.

The powerup tag wearable units 704 include microcontrollers that contain instances of state machines run on software and hardware components. The powerup tag base units 706 monitor the powerup tag wearable units 704 for state changes, using radio communication, through network 710. If the powerup tag base unit 706 detects a state change in any of the powerup tag wearable units 704 it broadcasts a notification signal to the network that contains information on which powerup tag wearable 704 unit's state machine changed state and which state the powerup tag wearable unit's 704 state machine transitioned to. All powerup tag wearable units 704 receive the notification signal and use their microcontrollers to activate I/O devices, located on powerup tag wearable units 704, to notify their users 702 of the change.

Figure 8:
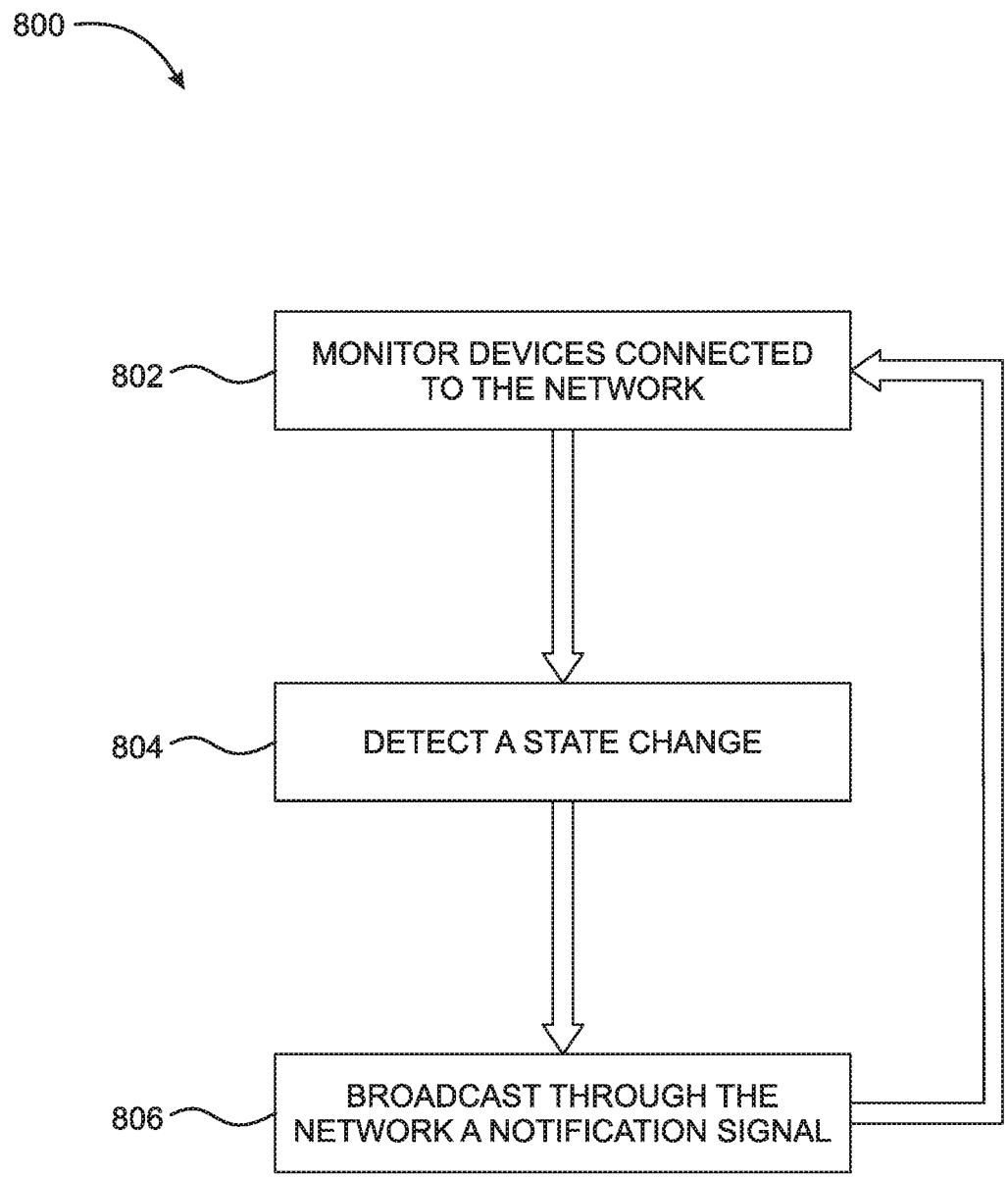
FIG. 8 is a flow diagram of the centralized device broadcasting a notification signal according to the preferred embodiment of the present invention.

FIG. 8 is a flow diagram of diagram of the preferred process 800 for monitoring and reacting to a state change executed on a powerup tag base unit or other client device/computer. At step 802, the powerup tag base unit monitors the client devices (e.g., the wearable powerup tag units) connected to the network for state changes using radio communication. At step 804, the powerup tag base unit detects a state change in one or multiple client devices (e.g. the wearable powerup tag units). At step 808, in response to detecting one or more state changes the powerup tag base unit broadcasts a notification signal through the network. The notification signal includes the identity of the client devices that changed state and the state the client devices transitioned to. The information the notification signal includes, can be relayed to users of the client devices using attached I/O devices. Finally, the powerup tag base unit returns to step 802 and continues to monitor the client devices.

State changes, in the preferred embodiment, can be initiated by the decoding of radio frequency signals produced by RFID tags. The RFID tags are located on glove units worn by users. The radio frequency signals produced by RFID tags contain a user identification number that identifies and is unique to the user who is wearing the glove.

Figure 9:
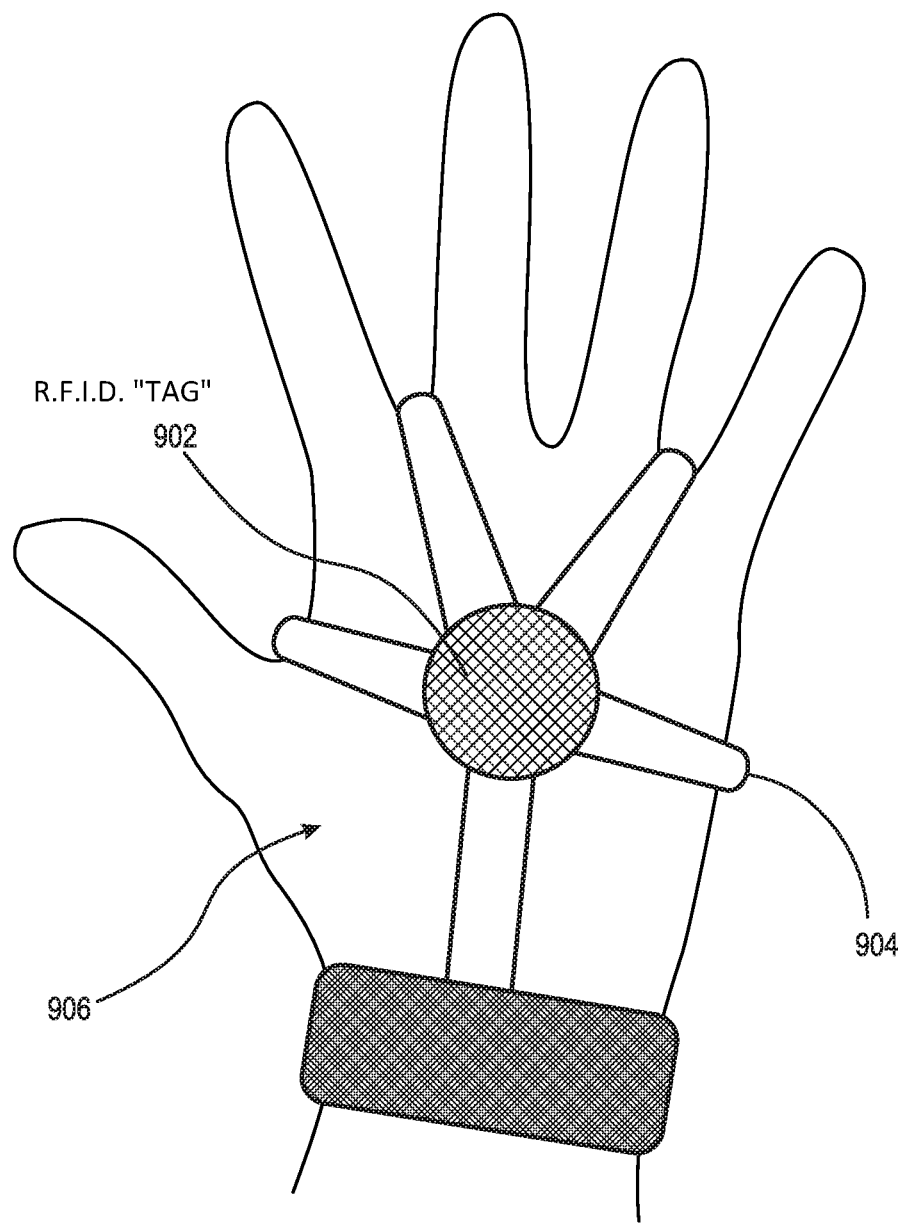
FIG. 9 is a schematic diagram of a powerup tag glove unit according to an embodiment of the present invention.

FIG. 9 is a schematic diagram of a glove unit containing a RFID tag. RFID tag 902 is located on the palm the hand of user 906. RFID tag 902 is attached to user 906 using straps 904. The radio frequency signals, produced by RFID tags 902 contain a user identification number that is paired to user 906.

Both, powerup tag wearable units and powerup tag base units have RFID tag readers configured to receive and decode the radio-frequency signals produced by RFID tags. The state changing process is different based upon if the RFID tag reader that decodes the radio-frequency signal produced by a RFID tag is located on a powerup tag wearable unit or a powerup tag base unit.

If a RFID tag reader located on a powerup tag wearable unit decodes the radio-frequency signal produced by a RFID tag, the powerup tag wearable unit will receive the signal and in response change state.

This interaction simulates the tagging action of traditional tag. When a first user with a RFID tag attached to their palm "tags" a second user with a RFID tag reader connected to a powerup tag wearable unit. The second user's powerup tag wearable unit registers the signal, with a RFID tag reader, and changes state. The state change is executed on a state machine running on software and hardware components of the microcontroller located on the main unit of the powerup tag wearable unit. The state change is then detected by the powerup tag base unit who broadcasts a notification signal, via radio through the network, to all powerup tag wearable units and powerup tag base units connected to the network. The notification signal allows all powerup tag wearable units to notify, with connected I/O devices, all users that a "tag" has occurred, who gave the "tag", and who received the "tag".

If a RFID tag reader located on a powerup tag base unit detects and decodes the radio-frequency signal of a RFID tag, the powerup tag base unit will send a transition signal, via radio through the network, to at least one powerup tag wearable unit. In response to the transition signal, state machines executed on the microcontrollers of the powerup tag wearable unit(s) will transition states. The state change is then detected by the powerup tag base unit who broadcasts a notification signal, via radio, to all powerup tag wearable units and powerup tag base units connected to the network.

A powerup tag base unit may be one of many programmable station types. The type of station controls both which powerup tag wearable units a transition signal is sent to and what state the transition signal causes the state machines, executed by the software and hardware components of the microcontrollers in the main units of the powerup tag wearable units, to transition to.

For example, a powerup tag base unit may be a "powerup station". A "powerup station" is programmed to send a transition signal only to the powerup tag wearable unit whose user's identification number was contained in the detected and decoded signal produced by the RFID tag.

Figure 10:
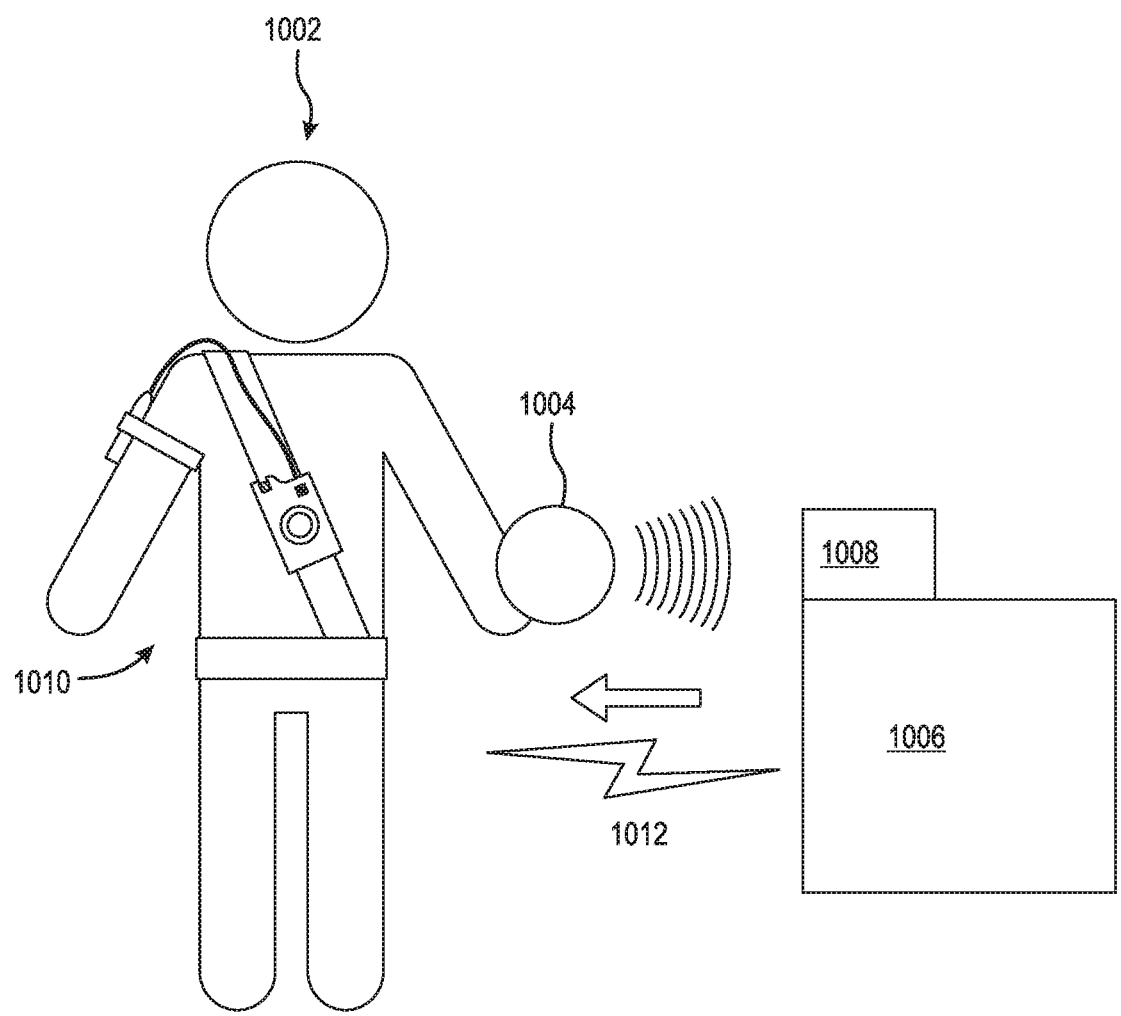
FIG. 10 is a schematic diagram of a centralized unit sending a transition signal according to the preferred embodiment of the present invention.

FIG. 10 is a diagram of the process of a state transition involving a "powerup station" powerup tag base unit User 1002, wearing both a glove unit 1004 containing a RFID tag and a powerup tag wearable unit 1010 with an instance of a state machine running on software and hardware components of the microcontroller in the main unit, approaches powerup tag base unit 1006 that is a "powerup station" type. RFID tag reader 1008, located on powerup tag base unit 1006, decodes the radio frequency signal produced by the RFID tag on glove unit 1004. Powerup tag base unit 1006 identifies powerup tag wearable unit 1010 using the user identification number contained in the radio frequency signal and sends a transition signal 1012, via radio, to power tag wearable unit 1010. Powerup tag wearable unit 1010, in response to receiving the transition signal changes the state of its state machine. The state transition initiates process 800 described in FIG. 8 which notifies all users of the state transition.

Another example station type is an "inversion station." In contrast to the a "powerup station" which only sends a transition signal to the powerup tag wearable unit of the user whose identification number was contained in the decoded radio frequency signal, an "inversion" sends a transition signal to all powerup tag wearable units connected to the network.

Another example station type is a "drain station." A drain station only sends transition signals to powerup tag wearable units whose state machines are in a specific state. A "drain station" once it detects and decodes the radio-frequency signal produced by a RFID tag will send transition signals only to powerup tag wearable units whose state machines are in the "powered up" state, causing all state machine in powered up state to transition to a different state.

Certain station types may also monitor the location and trajectory of the powerup tag wearable units, or receive location and trajectory information from the powerup tag wearable units, and only sends transition signals to powerup tag wearable units whose location and/or trajectory meets programmable conditions (e.g. a "grenade station" that only sends transition signals to powerup tag wearable units that are located within 10 meters from the power up tag base unit or a "blinding station" that only sends transition signals to powerup tag wearable units whose trajectories are moving towards the station).

The programmable nature of station types allows for a potentially limitless range of station types to be devised that can be used to initiate any combination of state transitions among any amount of powerup tag wearable units dependent on a multitude of factors including but not limited to, the location of the power up tag wearable units, the trajectory of the power up tag wearable units, the identification number contained in the decoded RFID signal, the current state of the power up tag wearable unit, or any combination of the aforementioned.

In the preferred embodiment, the powerup tag wearable units monitor how long they have stayed in a current state. If a set programmable period of time elapses while the powerup tag unit remains certain states, the power up tag wearable units change states without needing to receive a transition signal. This decaying action forces the users to continually change how they play the game and disincentivizes static gameplay.

The location and trajectory of the powerup tag wearable units are also monitored. The monitoring may be done by the powerup tag wearable units, the powerup tag base units, or both. If a powerup tag wearable units' trajectory and location relative to each other meets certain programmable conditions then the state machine executed on the microcontroller of the powerup tag wearable units will transition states.

Programmable Game Server

Figure 11:
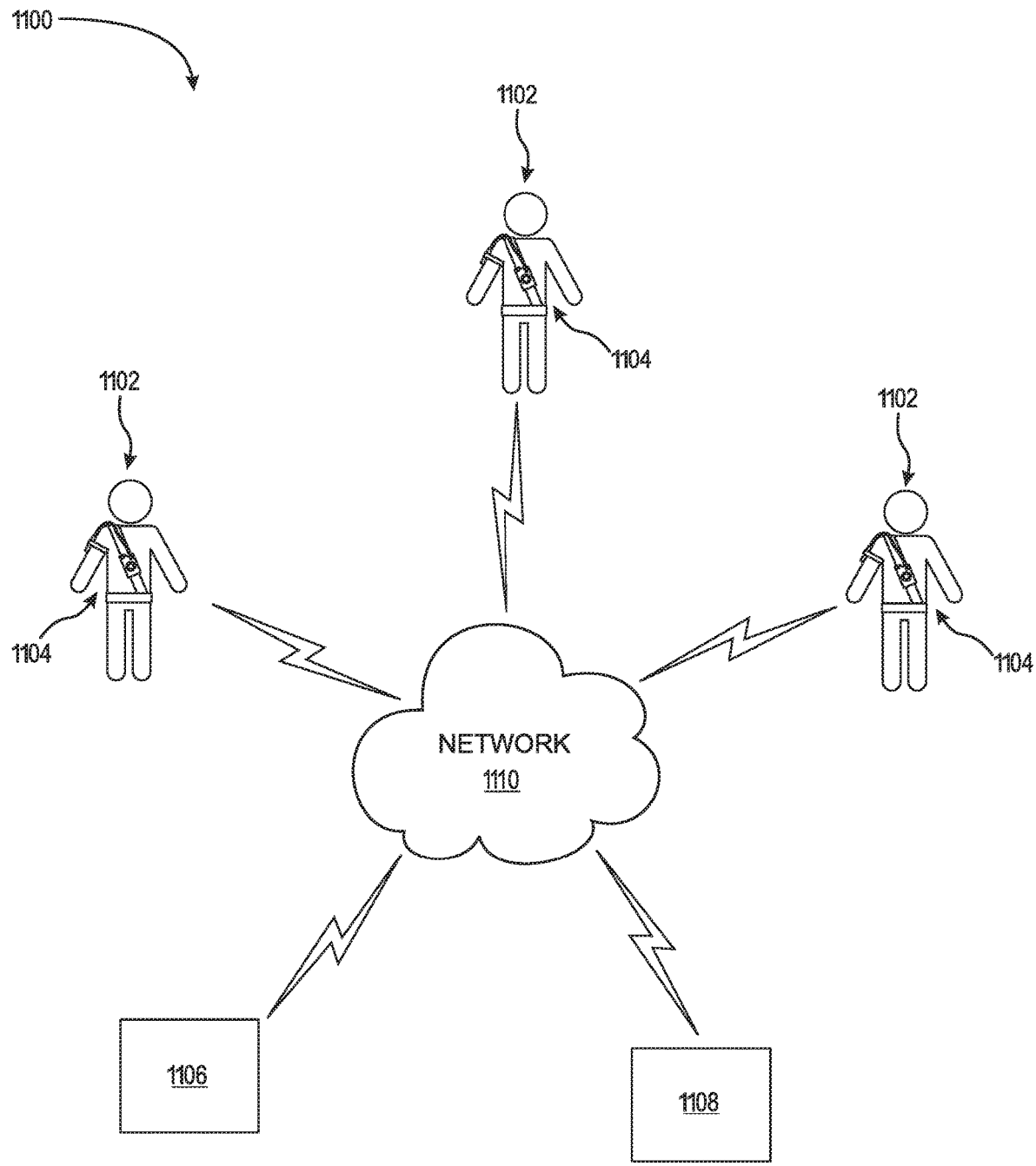
FIG. 11 is a schematic diagram of a computer network environment in which embodiments can be deployed.

FIG. 11 is a schematic diagram of an example embodiment's computer network 1100. The network 1110 uses radio communication. The example embodiment includes at least two users 1102 each wearing powerup tag wearable units 202 (which can be composed of either two pieces 202-1 or one piece 202-2, for example), 1104 and at least one powerup tag base unit 302, 1106. The powerup tag wearable units 1104 are clients/satellite units and the power up tag base unit 1106 is a server/centralized unit in the network 170, 1110. The example embodiment also includes a programmable game server 1108 (e.g., mobile telephone, tablet, or laptop computer) that is configured to, responsive to receiving radio-frequency (RF) signals, determine states of the units 1104 based on instructions for the interactive game, and broadcast a first and a second transition radio-frequency (RF) signal based on the determined states. The programmable game server 1108 can be programmed with instructions for multiple interactive games, and can include an interface configured to accept instructions for an interactive game, or an interface configured to enable a user to specify instructions for an interactive game.

The following is an example of JSON-formatted code that can be provided to the gaming server 1108. The code defines the rules for two games: "domination" and "powerup tag."

```
var games = {
    "domination": {
```

-continued

```
"teams":"2",
"npcRoleDistribution": "even",
"winCheck": ["var domTeam = 0;",
    "var gameOver = true;",
    "for (var mac in players) {",
    "var player = players[mac];",
    "if (player.role=='player') {continue;}",
    "if (player.team!=0) {",
    "if (domTeam!=0 && player.team!=domTeam) {",
    "gameOver = false;",
    "break;",
    "}",
    "domTeam = player.team;",
    "}",
    "}",
    "if (gameOver) {",
    "gameOver( );",
    "showTeamWin(domTeam);",
    "}"
],
"roles": {
    "player": {
        "roleId": 1,
        "idle": {
            "color":"self.team.color"
        }
    },
    "domnode": {
        "roleId": 2,
        "untagged": {
            "color":"#999999",
            "onTag":"self.changeState('tagged');
            self.setTeam(tagger.team);winCheck( );",
        },
        "tagged": {
            "color": "self.team.color"
        }
    }
}
},
"powerup tag": {
"teams": "0",
"npcRoleDistribution": "even",
"winCheck": ["var winnerCount = 0;",
        "var winner = null;",
        "var someOut = false;",
        "for (var mac in players) {",
        "var player = players[mac];",
        "if (player.role!='player') {continue;}",
        "if (player.state == 'tagged') {",
        "winner = null;",
        "break;",
        "}",
        "else if (player.state == 'idle' || player.state == 'powered') {",
        "winner = player;",
        "winnerCount ++;",
        "}",
        "else if (player.state == 'out') {",
        "someOut = true;",
        "}",
        "}",
        "if (someOut && winnerCount == 1) {",
        "gameOver( );player.showWin( );",
        "}"],
"roles": {
    "player": {
        "roleId": 1,
        "idle": {
            "color":"#000099",
            "showHeartbeat":"true",
            "onTag": "if (tagger.state=='powered_up')
            {self.changeState('tagged');} else
{tagger.showError( );} "
        },
        "tagged": {
            "color":"#990000",
            "timeout":10000,
            "showHeartbeat":"false",
            "animation":"countdown",
```

-continued

```
    "onComplete":"self.changeState('out');winCheck( );"
  },
  "out": {
    "color":"rainbow",
    "showHeartbeat":"false"
  },
  "powered": {
    "color":"#990000",
    "timeout":10000,
    "showHeartbeat":"false",
    "animation":"flash",
    "animationSpeed":"500"
  }
},
"powerup": {
  "roleId":3,
  "idle": {
    "color":"#990000",
    "onTag":"if (tagger.state == 'idle')
      {tagger.changeState('powered'); self.showAction( );}
   else {self.showError( );}"
  }
},
"health": {
  "roleId":4,
  "idle": {
    "color":"#009900",
    "onTag":"if (tagger.state == 'tagged') {tagger.changeState('idle');
      self.showAction( );} else
   {self.showError( );}"
  }
 }
 }
 }
}
```

In some embodiments, the various units can all share an identical design: network communication hardware, hardware for user feedback (e.g., audio, light, and haptic), and hardware to register a near field communication (NFC) signal. In such embodiments, gameplay is not dictated by the units. Instead the units can register the presence of an NFC signal, initiate, stop, and register the expiration of a timer, and obey instructions for user feedback. All game logic is instead controlled by a separate computer system ("game server," which can be, for example, a smart phone, tablet, laptop, or similar device. Messages are sent to the units from the separate game server and received from the units by the game server. The game server uses messages received as inputs, which it logically evaluates against a set of instructions that define the actual game play. The set of instructions can be encoded in, for example, JSON, XML, YAML, or similar formats. The game server may also have a process and mechanism for accepting new scripted instructions and adding them to the server's roster of available games. Using a scripting language or, alternatively, a graphical code construction interface, users can define their own games, install them in the game server, and execute gameplay by means of the network interaction between the units and the server. This ability adds infinite variety to the gameplay available by the combination of gaming units and the game server. In some embodiments, geographically disparate gamers can share their user-created games by way of the Internet.

The game server, state machines, and related system components may include a blockchain implementation that records transactions related to the game play. For example, transactions related to the radio-frequency identification (RFID) tag(s) configured to produce a radio-frequency (RF) signal may be recorded on a blockchain structure stored on a cloud system. On an example blockchain structure, transactions (including state transitions) related to the first satellite device and a first RFID tag reader may be recorded. Any transmissions to the game server, for example, including the radio-frequency (RF) signal produced by the RFID tag with the first RFID tag reader may be recorded in the blockchain system. Any transactions/signals transmitted or processed by any satellite devices, e.g. having a RFID tag reader, that are configured to receive, decode, and transmit to the game server the radio-frequency (RF) signal produced by the RFID tag with the second RFID tag reader may be recorded in the blockchain. The game server being configured to, responsive to receiving radio-frequency (RF) signals, determine states of the first satellite device and the second satellite device based on instructions for the interactive game, and broadcast a first and a second transition radio-frequency (RF) signal based on the determined states, and these state transitions and related transactions may be recorded in the blockchain. State transitions and transactions related to the RFID system components may be recorded on the blockchain and associated with a respective player based on a player ID, which may correspond to their respective pubic key. The RFID system components maybe represented by tokens on the blockchain. In one example, the game RFID tokens may be programmed to be responsive to game rules as they related to state changes. Each RFID token maybe linked with transactions on the blockchain representative of such state changes for each player. In one example, the Ethereum blockchain system will be used to provide a distributed ledger to record all transactions and state changes. In one example, the game tokens may be implemented using the ERC20 and ERC721 Ethereum token protocols, or the OASIS PKCS 11 token protocols. In another example, the game tokens may be associated with respective player's wallets, which are maintained by the game server. In another example, the state machines may be tokenized, and the state transitions may be written as transactions associated with each token. Because of the data integrity and immutability technical advantages provided by a blockchain, the present gaming system can benefit by providing a ledger recording state changes, that can be secure, thus increasing confidence in the game. Further, in the distributed blockchain example, the tokens recording state transitions and other transactions in the game can be further programmed with instructions and rules enabling other instances of gamers to join the game even if they are an untrusted party.

Example Implementations

While this invention has been particularly shown and described with references to example embodiments thereof, it will be understood by those skilled in the art that various changes in form and details may be made therein without departing from the scope of the invention encompassed by the appended claims.

For example, although reference is made to RFID technology, those skilled in the art will know that any kind of communication technology could be used in the context of the example embodiments, such as NFC (Near Field Communication) tag technology.

What is claimed is:

1. A computing system for providing an interactive game, the computing system comprising:
    a programmable game server configured to enable rules of the interactive game;
    the programmable game server dynamically changing the rules of the interactive game in response to receiving a radio-frequency (RF) broadcast from at least one of: a first satellite device or a second satellite device;
a radio-frequency identification (RFID) tag configured to produce a radio-frequency (RF) signal;
the first satellite device, having a first RFID tag reader, configured to receive, decode, and transmit to the programmable game server the radio-frequency (RF) signal produced by the RFID tag with the first RFID tag reader, the first satellite device sending instructions to the programmable game server causing the rules of the interactive game to change;
the second satellite device, having a second RFID tag reader, configured to receive, decode, and transmit to the programmable game server the radio-frequency (RF) signal produced by the RFID tag with the second RFID tag reader, the first satellite device sending instructions to the programmable game server causing the rules of the interactive game to change;
the programmable game server being configured to, responsive to receiving radio-frequency (RF) signals, determine states of the first satellite device and the second satellite device based on the instructions for the interactive game from the first satellite device and the instructions from the second satellite device;
the programmable game server broadcasting a first and a second transition radio-frequency (RF) signal based on the determined states;
the first satellite device being configured to change state in response to the first transition radio-frequency (RF) signal; and
the second satellite device being configured to change state in response to the second radio-frequency (RF) transition signal.

2. The computing system for providing an interactive game as in claim 1 wherein the programmable game server is configured to be programmed for multiple interactive games.

3. The computing system for providing an interactive game as in claim 1 wherein the programmable game server includes an interface configured to accept the instructions for the interactive game from the first satellite device and the second satellite device.

4. The computing system for providing an interactive game as in claim 1 wherein the programmable game server includes an interface configured to enable a user to author and change the rules of the interactive game.

5. The computing system for providing an interactive game as in claim 1 wherein the programmable game server is any of a mobile telephone, tablet, and laptop computer.

6. The computing system for providing an interactive game as in claim 1 further including a centralized device, having a third RFID tag reader, configured to:
receive and decode the radio-frequency (RF) signal produced by the RFID tag with the third RFID tag reader; and
responsive to receiving and decoding the radio-frequency (RF) signal of the RFID tag, broadcast the first and second transition radio-frequency (RF) signals.

7. The computing system for providing an interactive game as in claim 6 wherein the centralized device is in communication with the programmable game server and determines the first and second transition radio-frequency (RF) signals based on the rules for the interactive game.

8. The computing system for providing an interactive game as in claim 7 wherein the centralized device is configured to monitor the first satellite device and the second satellite device for state changes, and if a state change is detected transmit a notification to the programmable game server.

9. The computing system for providing an interactive game as in claim 6 wherein the programmable game server resides on the centralized device.

10. A method for providing an interactive game, the method comprising:
enabling the interactive game using a programmable game server;
in response to receiving a radio-frequency (RF) broadcast from at least one of: a first satellite device or a second satellite device, dynamically changing rules of the interactive game using the programmable game server;
producing, by a RFID tag, a radio-frequency (RF) signal;
configuring, the first satellite device, having a first RFID tag reader, to receive, decode, and transmit to a programmable game server the radio-frequency (RF) signal produced by the RFID tag with the first RFID tag reader;
causing the rules of the interactive game to change in response to the first satellite device sending instructions to the programmable game server;
configuring, the second satellite device, having a second RFID tag reader, to receive, decode, and transmit to the programmable game server the radio-frequency (RF) signal produced by the RFID tag with the second RFID tag reader;
causing the rules of the interactive game to change in response to the second satellite device sending instructions to the programmable game server;
configuring the programmable game server to, responsive to receiving radio-frequency (RF) signals, determine states of the first satellite device and the second satellite device based on the instructions for the interactive game from the first satellite device and the instructions from the second satellite device, and broadcast a first and a second transition radio-frequency (RF) signal based on the determined states;
transitioning state, by the first satellite device, in response to receiving the first transition radio-frequency (RF) signal; and
transitioning state, by the second satellite device, in response to receiving the second radio-frequency (RF) transition signal.

11. The method for providing an interactive game in claim 10 further including programming the programmable game server for multiple interactive games.

12. The method for providing an interactive game in claim 10 wherein the programmable game server includes an interface configured to accept the instructions for the interactive game from the first satellite device and the instructions from the second satellite device.

13. The method for providing an interactive game in claim 10 wherein the programmable game server includes an interface configured to enable a user to specify instructions for the interactive game.

14. The method for providing an interactive game in claim 10 wherein the programmable game server is any of a mobile telephone, tablet, and laptop computer.

15. The method for providing an interactive game in claim 10 further including configuring a centralized device, having a third RFID tag reader, to:
receive and decode the radio-frequency (RF) signal produced by the RFID tag with the third RFID tag reader; and responsive to receiving and decoding the radio-frequency (RF) signal of the RFID tag, broadcast the first and second transition radio-frequency (RF) signals.

16. The method for providing an interactive game in claim 15 wherein the centralized device is in communication with the programmable game server and determines the first and second transition radio-frequency (RF) signals based on the instructions for the interactive game from the first satellite device and the instructions from the second satellite device.

17. The method for providing an interactive game in claim 16 further including, at the centralized device, monitoring the first satellite device and the second satellite device for state changes, and if a state change is detected transmitting a notification to the programmable game server.

18. The method for providing an interactive game in claim 16 wherein the programmable game server resides on the centralized device.

19. A non-transitory computer program product for providing an interactive game, the computer program product being embodied on a computer-readable medium and comprising code configured to implement rules of the interactive game so as when executed on one or more computer processors to perform operations of:
  dynamically changing the rules of the interactive game in response to receiving a radio-frequency (RF) broadcast from at least one of: a first satellite device or a second satellite device;
  producing, by a RFID tag, a radio-frequency (RF) signal;
  configuring, the first satellite device, having a first RFID tag reader, to receive, decode, and transmit to a programmable game server the radio-frequency (RF) signal produced by the RFID tag with the first RFID tag reader;
  configuring, the second satellite device, having a second RFID tag reader, to receive, decode, and transmit to the programmable game server the radio-frequency (RF) signal produced by the RFID tag with the second RFID tag reader;
  configuring the programmable game server to, responsive to receiving radio-frequency (RF) signals, determine states of the first satellite device and the second satellite device based on the rules for the interactive game from the first satellite device and the instructions from the second satellite device, and broadcast a first and a second transition radio-frequency (RF) signal based on the determined states;
  transitioning state, by the first satellite device, in response to receiving the first transition radio-frequency (RF) signal; and
  transitioning state, by the second satellite device, in response to receiving the second radio-frequency (RF) transition signal.

* * * * *

UNITED STATES PATENT AND TRADEMARK OFFICE
CERTIFICATE OF CORRECTION

PATENT NO.        : 10,967,256 B2                               Page 1 of 1
APPLICATION NO.   : 16/378123
DATED             : April 6, 2021
INVENTOR(S)       : Joseph A. Fortuna, Jr.

It is certified that error appears in the above-identified patent and that said Letters Patent is hereby corrected as shown below:

On the Title Page

Item (57), Lines 8-9, after "finite state machine. The client", delete "deceives" and insert -- devices --.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*